United States Patent [19]

Hagedorn

[11] 4,229,017
[45] Oct. 21, 1980

[54] KING PIN ASSEMBLY

[75] Inventor: Vincent H. Hagedorn, Plymouth, Mich.

[73] Assignee: Ford Motor Company, Dearborn, Mich.

[21] Appl. No.: 947,281

[22] Filed: Sep. 29, 1978

[51] Int. Cl.$^2$ .............................................. B60G 3/02
[52] U.S. Cl. ................................ 280/96.1; 308/120 A
[58] Field of Search ............................ 280/96.1, 660; 308/120 A

[56] References Cited

U.S. PATENT DOCUMENTS

| | | | |
|---|---|---|---|
| 1,569,311 | 1/1926 | Barstow | 280/96.1 |
| 2,428,651 | 10/1947 | Buese | 280/96.1 |
| 2,512,881 | 6/1950 | Smiley | 308/120 A |
| 3,388,923 | 6/1968 | Maynard | 280/96.1 |

Primary Examiner—John. J. Love
Assistant Examiner—John A. Carroll
Attorney, Agent, or Firm—Steven L. Permut; Clifford L. Sadler

[57] ABSTRACT

A vehicle suspension assembly has a spindle with lower and upper arms forming a yoke, a knuckle support portion of a front axle fitted between the lower and upper arms, a kingpin extending through aligned holes in the knuckle support and lower and upper arms, a bearing assembly between the knuckle support and lower arm, a plate with a threaded aperture affixed to the spindle and a bolt threaded through the plate and abutting the top end of the kingpin to push the knuckle against the bearing assembly to assure a flush fit without vertical play of the bearing assembly between the lower arm and knuckle support.

10 Claims, 5 Drawing Figures

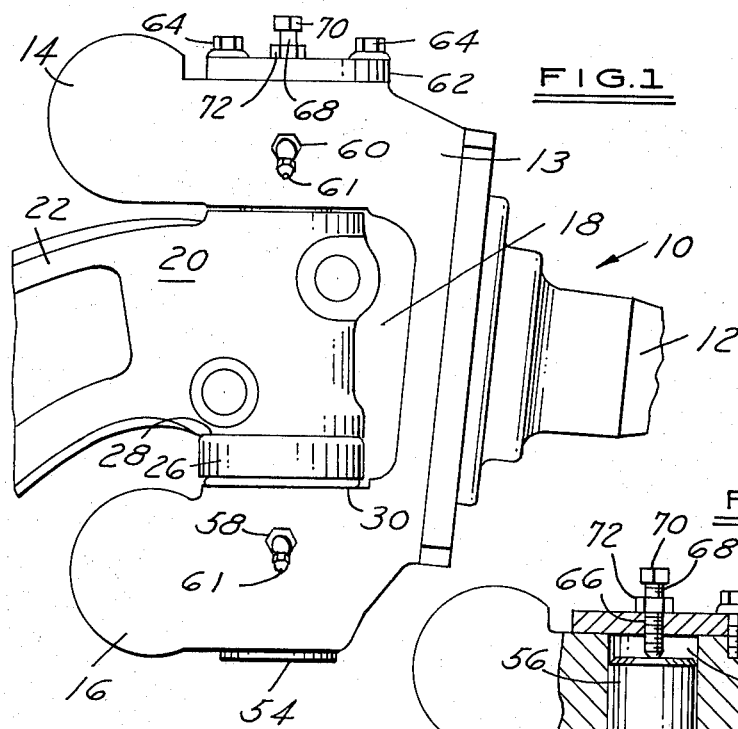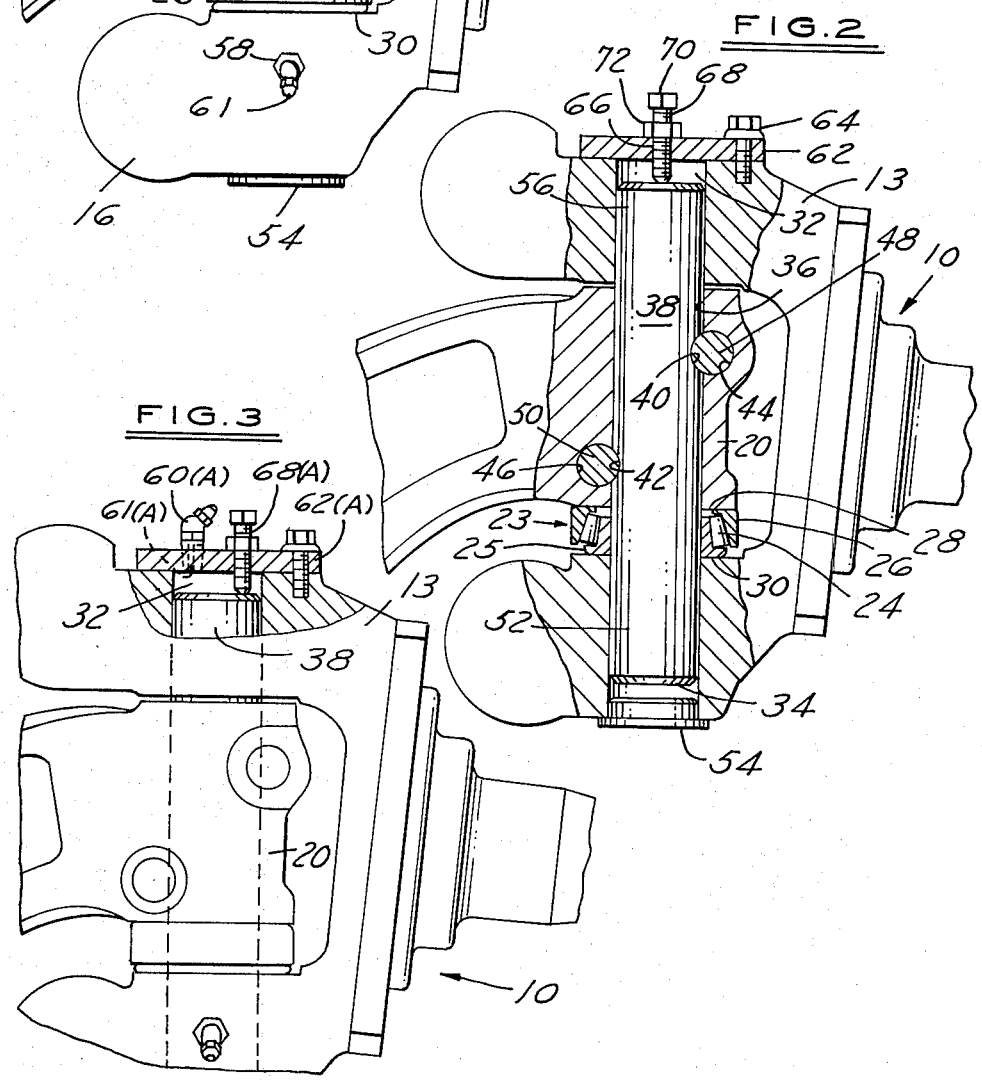

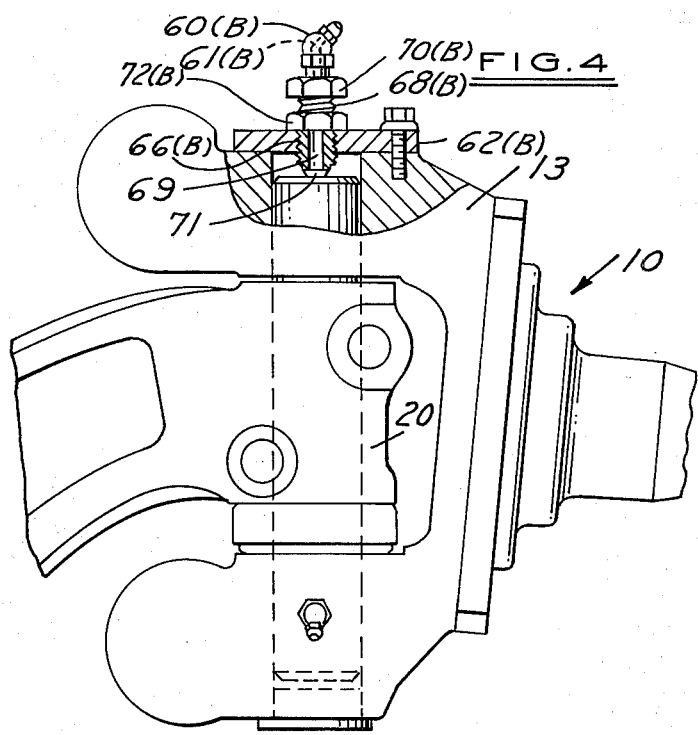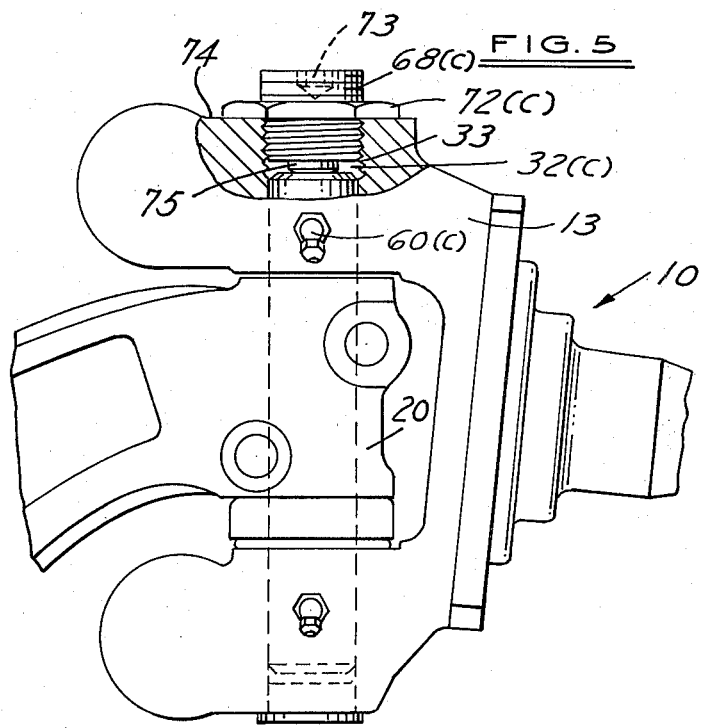

KING PIN ASSEMBLY

BACKGROUND OF THE INVENTION

1. Field of the invention

This invention relates to a kingpin assembly and more particularly to a shimless adjustable kingpin assembly for motor vehicles and the like.

2. Description of the Prior Art

In one conventional front suspension for a vehicle such as a truck, the front axle is connected to wheel supporting spindle or trucks by a kingpin. Commonly, the spindle assembly has a yoke portion and the end of the axle has an aperture. The kingpin extends through aligned holes in the yoke portion and the aperture in the axle to provide a means for the spindle to pivot about a vertical steering axis.

Kingpin assemblies conventionally have been made with a kingpin having each end rotatably mounted in the holes in upper and lower arms which form the yoke of the spindle. The aperture end of the axle forms a knuckle support that is located between the upper and lower arms of the yoke of the spindle or knuckle. The knuckle support is either rotatably or non rotatably engaged to the kingpin. Bearings are usually mounted between the knuckle support at the end of the axle and lower arm of the spindle yoke to permit the low frictional movement of the spindle about a vertical steering axis with respect to the axle.

Due to manufacturing tolerances, the knuckle support and kingpin bearing are often not precisely fitted between the upper and lower arms of the yoke. A gap or clearance created allows the knuckle to longitudinally move along the kingpin and move away from the bearings. Jolts and bumps can cause the jostling of the knuckle or spindles to rapidly move up and down which can produce extreme and often harmful stresses on the bearing. The extreme and harmful stresses can shorten the useful life of the bearings.

Conventionally, the way to eliminate the problem of excessive vertical play (i.e. vertical movement of the knuckle support relative to the kingpin bearing) is to put one or more shims between the upper arm of the spindle and knuckle. The shims fill in the gap such that the end of the axle, the bearing and shims snugly fit between the lower and upper arms of the yoke.

U.S. Pat. No. 2,428,651 issued to Buese on Oct. 7, 1947 discloses a kingpin assembly having a threaded end which engages a threaded aperture through the lower arm of the spindle. The upper end of the kingpin assembly has a shoulder section that extends through a hole in the upper arm of the spindle. The kingpin extends through the knuckle support of the axle and is manually threaded through the threaded aperture until the shoulder section abuts the upper bearings and forces then are forced downwardly which in turn forces the knuckle support downwardly against the lower bearings thereby eliminating any longitudinal movement of the axle with respect to the spindle. This kingpin assembly requires the use of a kingpin with an integral threaded end, an integral shoulder section, and an integral wrench engaging head.

SUMMARY OF THE INVENTION

According to the invention, a kingpin assembly in a vehicle suspension is assembled snugly without the use of shims. A spindle or knuckle has spaced first and second arms forming a yoke. Each arm has a hole therein, each hole being aligned along a common axis. A knuckle at the end of a vehicle front axle is sized to fit within the space between the two arms. The knuckle support has an aperture extending therethrough. A kingpin is sized to extend through the aperture of the knuckle support and extend into the holes in the first and second arms. A kingpin bearing is positioned about the kingpin and operatively interposed between the knuckle support and one of the yoke arms.

In according with the invention adjusting means are provided to compensate for manufacturing tolerances which may otherwise produce excessive clearance between the arms of the spindle yoke and the kingpin bearing and knuckle support.

A separate adjustable bolt member is longitudinally adjustable in the hole of the first arm. The bolt member is adjustable in a plurality of fixed longitudinal positions in the hole of the first arm. In some embodiments, the bolt threadably engages the hole.

In one embodiment, a plate is secured to the top of the first yoke arm covering the hole in the first arm. The plate has a threaded aperture therethrough vertically aligned with the hole in the upper arm. The bolt threadably engages the aperture through the plate.

In another embodiment, the hole in the first arm is internally threaded. In operation, the bolt is operably connected to the knuckle support to press the knuckle support toward the opposing arm such that the bearings positioned between one of the arms and the knuckle support are in abutting relationship with both.

In one embodiment, the bolt is in abutting relationship with the kingpin such that the kingpin is pushed toward the opposing arm. In this embodiment, a locking means longitudinally fix the kingpin to the knuckle support such that the knuckle support is also pushed toward the opposing arm.

One embodiment has a grease fitting extending through the first arm of the sprindle. The fitting has a bore therethrough in fluid communication with the hole in the first arm for allowing the introduction of lubricant through the fitting and into the hole.

In another embodiment the grease fitting extends through the plate with the fitting having a bore therethrough in fluid communication with the hole in the first arm.

In yet another embodiment, the fitting is mounted on top of the threaded bolt means where the bolt means has a bore therethrough in fluid communication at one end with the bore in the fitting and at an opposing end with the hole in the first arm.

In one embodiment a lock nut having an internally threaded aperture threadably engages the threaded bolt means for movement along the threaded bolt means to an abutting position with one of the first arm and plate such that the bolt means can be locked in the longitudinal position.

BRIEF DESCRIPTION OF THE DRAWINGS

Reference now will be made to the following drawings, in which:

FIG. 1 is a side elevational view of one embodiment of the invention.

FIG. 2 is a side elevational partially segmented view of the embodiment shown in FIG. 1.

FIG. 3 is a side elevational partially segmented view of a second embodiment of the invention.

FIG. 4 is a side elevational partially segmented view of a third embodiment of the invention.

FIG. 5 is a side elevational partially segmented view of a fourth embodiment of the invention.

DESCRIPTION OF THE PREFERRED EMBODIMENTS

Referring specifically to FIG. 1, a spindle or steering knuckle assembly 10 has a spindle portion 12 and a yoke portion 13 with an upper arm 14 and a lower arm 16 with a space 18 situated therebetween. A knuckle support 20 has an aperture 36 therethrough. The apertures 32, 34 and 36 are in alignment and receive a kingpin 38. The lower end 52 of kingpin 38 extends into aperture 34 of lower arm 16. The bottom portion of aperture 34 is capped by cap 54. The top portion 56 of kingpin 38 extends into aperture 32 in upper yoke arm 14.

The kingpin is cylindrical in shape with two indentations 40 and 42. The knuckle support 20 has two apertures 44 and 46 which intersect aperture 36 and positioned to be aligned with indentations 40 and 42 in the kingpin 38. Lock pins 48 and 50 extend through holes 44 and 46 respectively to lock kingpin 38 in a longitudinally and rotatably fixed position with respect to the knuckle support 20.

A tapered roller bearing 23 has thrust bearing elements 24 disposed between an outer bearing race 26 located against the bottom surface edge 28 of the knuckle support 20 and an inner bearing race 25 disposed against the top surface 30 of lower yoke 16.

Grease fittings 58 and 60 are fitted on the sides of lower arm 16 and upper arm 14, respectively. The fittings 58 and 60 each have a bore 61 therethrough which is in communication with the apertures 34 and 32, respectively.

The top end of aperture 32 is covered by a plate 62. The plate 62 is bolted onto upper arm 18 by three fasteners 64. The plate 62 has a threaded aperture 66 therethrough that receives a threaded adjusting bolt 68 with a hexagonal head 70. The bolt 68 has sufficient length to abut the top end 56 of kingpin 38. A lock nut 72 also threadably engages adjusting bolt 68 above the plate 62.

In operation, a lubricant such as a heavy grease is introduced through the grease fitting 58 into aperture 34 and to the bearing 26. Likewise, grease is introduced into aperture 32 through grease fitting 60. The head 70 of adjusting bolt 68 may be engaged by a wrench so that the threaded bolt 68 is threaded in aperture 66 to abut the kingpin 38 and push the kingpin downward. The kingpin 38 is moved downward, relative to the spindle 10, until the knuckle support 20 is flush against the bearing assembly 23 which in turn abuts the upper surface 30 of lower arm 16. The wrench is then turned to assure that the bolt 68 is locked into position.

In this fashion, the knuckle support 20 is locked into abutting position with the outer bearing race to prevent any longitudinal movement of the knuckle support 20 with respect to the bearing assembly 23 which could harmfully damage the bearing elements 24.

Referring to FIG. 3, a second embodiment is shown in which the adjusting bolt 68(a) is threaded into an aperture 66(a) which is off-centered with respect to the aperture 32 and upper arm 18. A grease fitting 60(a) is mounted onto the plate 62(a) with the fitting having a bore 61(a) passing through the plate in communication with the aperture 32. The operation of the embodiment shown in FIG. 3 is substantially the same as the embodiment of FIGS. 1 and 2.

Referring to FIG. 4 for another embodiment, plate 62(b) has an expanded aperture 66(b). Bolt 68(b) is threadably received into aperture 66(b). The bolt 68(b) has a lock nut 72(b) threadably engaging its threaded portion. The hexagonal head 70(b) has a fitting 60(b) mounted on its top surface. The adjusting bolt 68(b) has a bore 69 therethrough which is in communication with the bore 61(b) of the fitting 60(b). Side ports 71 extend from the bore 69 to the threaded exterior of the bolt 68(b). Grease passes through bore 61(b) into bore 69 then out through side ports 71 into aperture 32 for lubricating kingpin 38. The operation of the adjusting bolt 68(b) is substantially the same as the operation of the embodiment shown in FIGS. 1 and 2.

Referring to FIG. 5, another embodiment is shown in which the aperture 32(c) has internal threads 33. Bolt 68(c) threadably engages threads 33. The adjusting bolt 68(c) has a socket 73 adapted to receive an Allen wrench. The adjusting bolt 68(c) has a protruding lower section 75 which engages the upper end 56 of kingpin 38. Lock nut 72(c) threadably engages the threaded adjusting bolt 68(c) and is moveable to a flush position with respect to the upper surface 74 of the upper arm 18 to lock the adjusting bolt 68(c) in position.

Fitting 60(c) is mounted on the side of arm 18 with the bore in communication with the aperture 32(c). The operation of the embodiment shown in FIG. 5 is substantially the same as the operation for embodiments of FIGS. 1 to 4.

In accordance with the invention means are provided for assuring a flush fit of the knuckle support and spindle assembly against the kingpin bearing. The flush fit is achieved by threading an adjustable bolt into position against the kingpin and locking the bolt in its position.

Variation and modification are possible within the scope of the foregoing disclosure and drawings without departing from the spirit of the invention which is defined by the appended claims.

I claim:

1. A king pin assembly comprising:
   a yoke with a first and second arm spaced apart from each other and a hole in each arm;
   a knuckle support sized to fit within the space between the two arms with an aperture extending therethrough and aligned with said holes in the two arms;
   a kingpin extending through the aperture in the knuckle support and into the holes in the two arms;
   retaining means for retaining the kingpin in its position relative to the knuckle support;
   a bearing assembly operatively interposed between the knuckle support and one of the arms;
   a separate adjustable member being longitudinally adjustable in the hole of the first arm;
   means for adjustably securing said separate member in a plurality of fixed longitudinal positions in the hole of the first arm;
   said separate member being operably connected to the knuckle support for pressing the knuckles and bearing assembly toward the second arm such that the bearing assembly is in snug abutting relationship interposed between the knuckle support and said one of the arms.

2. A kingpin assembly as defined in claim 1 wherein; the adjustable securing means includes threaded means fixed to said first arm; said separate member includes a threaded bolt member threadably engaging said threaded means.

3. A kingpin assembly as defined in claim 2 and further comprising:
said threaded bolt member being in abutting relationship with the kingpin; the threaded bolt member extending into the hole in the first arm; the retaining means includes locking means for longitudinally fixing the kingpin to the knuckle support.

4. A kingpin assembly as defined in claim 3 wherein the thread means includes a plate secured to the top of the first arm covering the hole in the first arm and having a threaded aperture therethrough vertically aligned with the hole in the first arm; the threaded bolt means threadably engages the threads in the plate.

5. A kingpin assembly as defined in claim 4 and further comprising:
a grease fitting extending through the first arm of the yoke; the fitting having a bore therethrough in fluid communication with the hole through the upper arm for allowing the introduction of lubricant through the fitting and into the hole.

6. A kingpin assembly as defined in claim 4 and further comprising:
a grease fitting extending through the plate; the grease fitting having a bore therethrough in fluid communication with the hole in the first arm for allowing the introduction of lubricant through the fitting and into the hole.

7. A kingpin assembly as defined in claim 6 wherein the fitting is mounted on top of the threaded bolt means the thread bolt means has a bore therethrough in fluid communication at one end with a second bore through the fitting and at an opposing end with the hole in the first arm.

8. A kingpin assembly as defined in claim 3 wherein the thread means comprises internal threads within the hole of the first arm and separate threaded bolt means threadably engages the internal threads.

9. A kingpin assembly as defined in claims 4 or 8 and further comprising a lock nut having an internally threaded aperture threadably engaging the threaded bolt means for movement to an abutting position with one of the upper arm and plate for locking the threaded bolt means in position.

10. A kingpin assembly as defined in claim 3 wherein the locking means includes horizontal grooves in the king pin; aperture through the knuckle support aligned with the grooves, and a locking pin extending through the apertures in the knuckle support and engaging the grooves in the king pin.

* * * * *